(12) United States Patent
Omori et al.

(10) Patent No.: US 12,145,530 B2
(45) Date of Patent: Nov. 19, 2024

(54) VEHICLE THEFT DETERRENT APPARATUS

(71) Applicant: SUBARU CORPORATION, Tokyo (JP)

(72) Inventors: Minoru Omori, Tokyo (JP); Takashi Takeda, Tokyo (JP); Satoru Akiyama, Tokyo (JP); Eiichi Shiraishi, Tokyo (JP); Shintaro Ikeda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 252 days.

(21) Appl. No.: 17/879,505

(22) Filed: Aug. 2, 2022

(65) Prior Publication Data

US 2023/0068994 A1 Mar. 2, 2023

(30) Foreign Application Priority Data

Aug. 27, 2021 (JP) .................. 2021-138857

(51) Int. Cl.
| | |
|---|---|
| B60R 25/02 | (2013.01) |
| B60Q 9/00 | (2006.01) |
| B60R 25/0215 | (2013.01) |
| B60R 25/25 | (2013.01) |
| B62D 5/04 | (2006.01) |
| B62D 15/02 | (2006.01) |
| G06V 20/59 | (2022.01) |
| G06V 40/16 | (2022.01) |

(52) U.S. Cl.
CPC ............ *B60R 25/0215* (2013.01); *B60Q 9/00* (2013.01); *B60R 25/25* (2013.01); *B62D 5/046* (2013.01); *B62D 15/02* (2013.01); *G06V 20/59* (2022.01); *G06V 40/172* (2022.01)

(58) Field of Classification Search
CPC ....... B60R 25/0215; B60R 25/25; B60Q 9/00; B62D 5/046; B62D 5/0463; B62D 15/02; B62D 6/001; G06V 20/59; G06V 40/172
USPC .................................. 701/36, 41, 42, 43, 44
See application file for complete search history.

(56) References Cited

FOREIGN PATENT DOCUMENTS

JP 2009-041384 A 2/2009

*Primary Examiner* — Hai H Huynh
(74) *Attorney, Agent, or Firm* — Rimon P.C.

(57) ABSTRACT

A vehicle theft deterrent apparatus includes a driver verifier, a steering torque detector, an actuator, and a steering controller. The steering torque detector is configured to detect steering torque input by a driver to a steering system. The actuator is configured to generate drive torque to be given to the steering system. The driver verifier is configured to verify whether driver information obtained from the driver matches registered information registered in advance. The steering controller is configured to control the drive torque generated by the actuator based on the steering torque. In a case where the driver verifier determines that the driver information does not match the registered information, the steering controller is configured to permit the driver to steer until a vehicle drives a set distance, and then to cause the actuator to generate the drive torque prohibiting the driver from steering.

18 Claims, 4 Drawing Sheets

VEHICLE THEFT DETERRENT APPARATUS

CROSS-REFERENCE TO RELATED APPLICATIONS

The present application claims priority from Japanese Patent Application No. 2021-138857 filed on Aug. 27, 2021, the entire contents of which are hereby incorporated by reference.

BACKGROUND

The disclosure relates to a vehicle theft deterrent apparatus configured to prevent theft by restricting vehicle behavior.

Various techniques for preventing vehicle theft have been proposed for vehicles such as automobiles. For example, Japanese Unexamined Patent Application Publication (JP-A) No. 2009-41384 apparatus discloses a vehicle control (theft deterrent apparatus) as follows. A person recognition unit equipped with a fingerprint reader configured to read an occupant's fingerprint is mounted in a vehicle. Fingerprint data from the fingerprint reader is verified against fingerprint data of a legitimate user registered in advance, and, if the occupant is not recognized as a legitimate user, an electric power steering apparatus performs interference control.

By the way, in the event of a disaster, it is generally necessary for a driver who is currently driving a vehicle to park the vehicle on the shoulder of the road when getting off from the vehicle to evacuate. On that occasion, the key is to be left in the vehicle to enable a third person to move the vehicle and clear the path for an emergency vehicle.

SUMMARY

An aspect of the disclosure provides a vehicle theft deterrent apparatus to be applied to a vehicle. The vehicle theft deterrent apparatus includes a driver verifier, a steering torque detector, an actuator, a driver verifier and a steering controller. The steering torque detector is configured to detect steering torque input by a driver who drives the vehicle to a steering system of the vehicle. The actuator is configured to generate drive torque to be given to the steering system. The driver verifier is configured to verify whether driver information obtained from the driver matches registered information registered in advance. The steering controller is configured to control the drive torque generated by the actuator based on the steering torque. In a case where the driver verifier determines that the driver information does not match the registered information, the steering controller is configured to permit the driver to steer until the vehicle travels a set distance, and then to cause the actuator to generate the drive torque to prohibit the driver from steering of the steering system.

An aspect of the disclosure provides a vehicle theft deterrent apparatus to be applied to a vehicle. The vehicle theft deterrent apparatus includes a steering torque sensor, an actuator, and one or more processors. The steering torque sensor is configured to detect steering torque input by the driver to a steering system of the vehicle. The actuator is configured to generate drive torque to be given to the steering system. The one or more processors are configured to verify whether driver information obtained from the driver matches registered information registered in advance, control the drive torque generated by the actuator based on the steering torque, and in a case where it is determined that the driver information does not match the registered information, permit the driver to steer until the vehicle travels a set distance and then cause the actuator to generate the drive torque to prohibit the driver from steering of the steering system.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

In a theft deterrent apparatus disclosed in JP-A No. 2009-41384, in the event of a disaster or the like, it is difficult for those other than the legitimate user to move the vehicle even if the key is left in the vehicle.

It is desirable to provide a vehicle theft deterrent apparatus capable of preventing theft of a vehicle while permitting the vehicle to move in the event of a disaster or the like.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
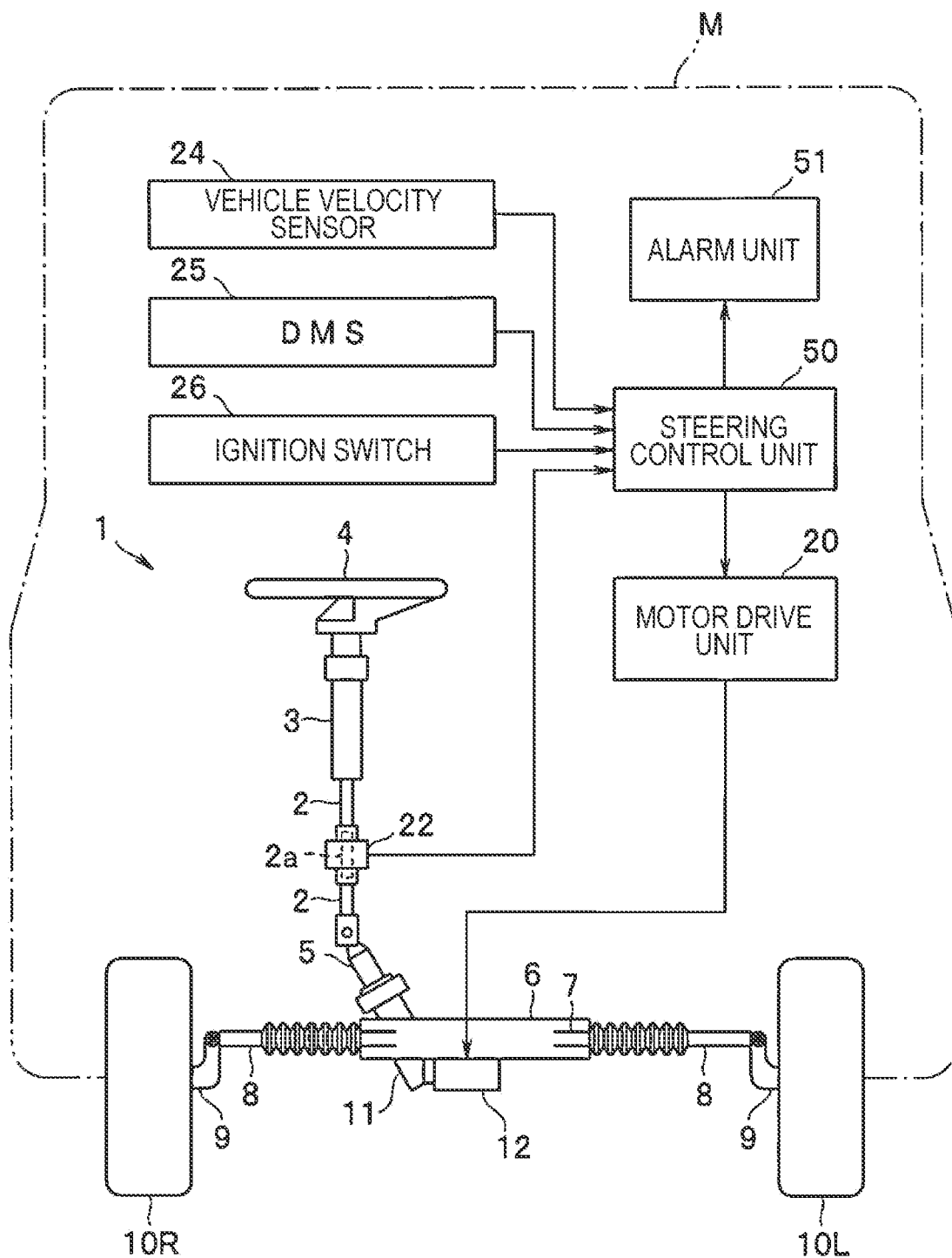
FIG. 1 is a schematic configuration diagram of an electric power steering apparatus mounted in a vehicle.

FIG. 1 illustrates an electric power steering (EPS) apparatus 1 mounted in a vehicle M. The steering system of the EPS apparatus 1 includes a steering shaft 2. The steering shaft 2 is rotatably supported by a body frame (not illustrated) of the vehicle M with a steering column 3 interposed therebetween.

A first end of the steering shaft 2 extends toward the driver's seat, and a second end of the steering shaft 2 extends toward the engine compartment. A steering wheel 4 is fixed in an end portion, on the driver's seat side, of the steering shaft 2.

In addition, a torsion bar 2a is disposed in the middle of the steering shaft 2. Furthermore, a pinion shaft 5 is contiguous with an end portion of the steering shaft 2 that extends toward the engine compartment. A torque sensor 22 is disposed on the outer circumference of the torsion bar 2a. In one embodiment, the torque sensor 22 may serve as a "steering torque detector".

The torque sensor 22 detects steering torque Td input by the driver to the steering system. In one example, the torque sensor 22 is capable of detecting the steering torque Td by detecting displacement between the steering wheel 4 side and the pinion shaft 5 side that occurs around the axis of the steering shaft 2 due to torsion of the torsion bar 2a.

In contrast, a steering gear box 6, which extends in the vehicle width direction, is disposed in the engine compartment. A rack shaft 7 is inserted into and supported by the steering gear box 6 to be freely reciprocatable. A pinion formed on the pinion shaft 5 is meshed with a rack (not illustrated) formed on the rack shaft 7. Accordingly, a rack and pinion type steering mechanism is configured in the steering system of the EPS apparatus 1.

In addition, left and right ends of the rack shaft 7 extend from end portions of the steering gear box 6. Front knuckles 9 are contiguous with the left and right ends of the rack shaft 7 with tie rods 8 interposed therebetween. The front knuckles 9 respectively support left and right wheels 10L and 10R, which serve as steered wheels, to be freely rotatable, and are supported by the body frame to be freely steerable. That is, when the steering wheel 4 is operated, the steering shaft 2 and the pinion shaft 5 are rotated. When the rack shaft 7 is moved to the left and right due to the rotation of the pinion shaft 5, the front knuckles 9 are rotated around a king pin shaft (not illustrated). Accordingly, the left and right wheels 10L and 10R are steered to the left and right.

In addition, an electric power steering motor (EPS motor) 12 is contiguous with the pinion shaft 5 with an assist transfer mechanism 11, which includes a deceleration gear mechanism such as a worm gear, interposed therebetween. In one embodiment, the EPS motor 12 may serve as an "actuator". The EPS motor 12 is, for example, an electric motor including a direct current (DC) brushless motor equipped with a stator fixed to a casing and a rotor rotating inside the stator. Rotation of the rotor of the EPS motor 12 is converted to movement in the axial direction of the rack shaft 7 through the assist transfer mechanism 11. This enables the EPS motor 12 to generate drive torque to be given to the steering system of the EPS apparatus 1.

A steering control unit 50 is connected to the EPS motor 12 with a motor drive unit 20 interposed therebetween.

Signals from sensors such as the torque sensor 22, a vehicle velocity sensor 24, which detects a vehicle velocity V, and a driver monitoring system (DMS) 25, which performs face recognition of the driver, are input to the steering control unit 50. In addition, signals from switches such as an ignition switch 26 are input to the steering control unit 50. Furthermore, an alarm unit 51 equipped with a display and a loudspeaker, for example, is connected to the steering control unit 50.

Here, the DMS 25 performs, for example, face recognition of the driver. To do so, the DMS 25 includes a camera (not illustrated) disposed in a dashboard or the like so as to face the face of the driver who sits in the driver's seat. The DMS 25 performs face recognition of the driver from, for example, an image captured by the camera, and obtains a feature point of the recognized driver's face as driver information (driver's face recognition information). In addition, the DMS 25 verifies the obtained driver information against registered information of a user registered in advance. As a result of the verification, if the recognized driver's face matches the face of the driver who has been registered as a user, the DMS 25 determines that the driver who sits in the driver's seat is a legitimate driver (registered driver). In one embodiment, the DMS 25 may serve as a "driver verifier".

The steering control unit 50 controls the driving of the EPS motor 12 through a motor drive unit 20.

In one example, in the case where it is determined by the DMS 25 that the driver information matches the registered information, the steering control unit 50 refers to, for example, a preset first map and calculates a first motor drive current I1. The first motor drive current I1 is a current for allowing the EPS motor 12 to generate first assist torque for the driver's steering as drive torque.

Figure 3:
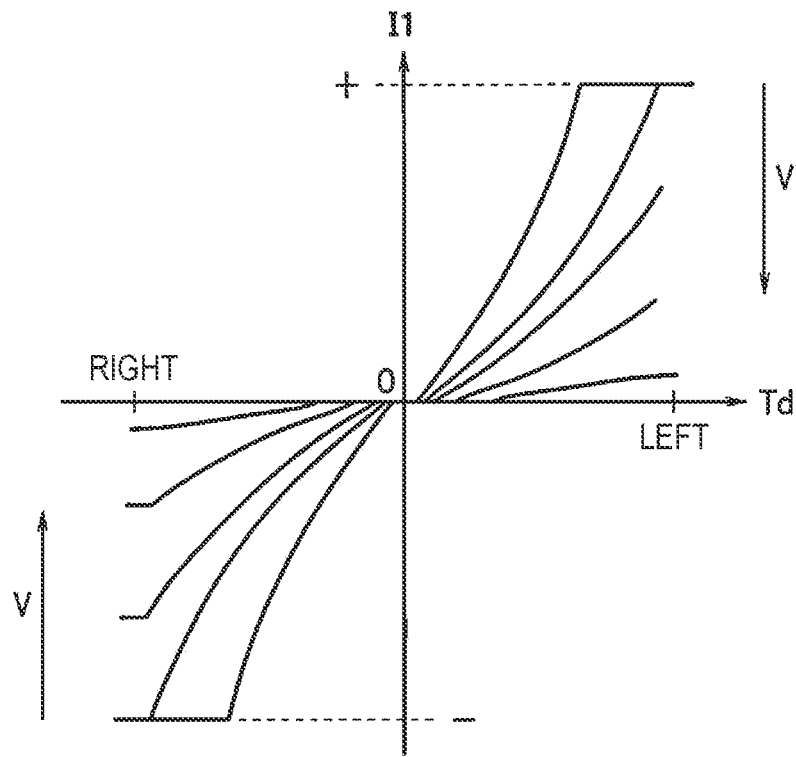
FIG. 3 is a characteristic diagram illustrating exemplary characteristics of steering torque-motor drive current during normal steering control.

As illustrated in FIG. 3, the first map is a three-dimensional map for calculating the first motor drive current I1 on the basis of the steering torque Td and the vehicle velocity V. On the basis of the first map, the steering control unit 50 calculates the first motor drive current I1 for increasing the drive torque (absolute value) toward the driver's steering direction as the steering torque Td (absolute value) is greater, and increasing the drive torque (absolute value) toward the driver's steering direction as the vehicle velocity V is smaller.

The first motor drive current I1 calculated as above is output to the EPS motor 12 through the motor drive unit 20. Accordingly, the EPS motor 12 generates drive torque (first assist torque) in accordance with the first motor drive current I1.

In addition, in the case where it is determined by the DMS 25 that the driver information does not match the registered information, the steering control unit 50 refers to, for example, a preset second map and calculates a second motor drive current I2 until the vehicle M travels a set distance Dth1. The second motor driver current I2 is a current for allowing the EPS motor 12 to generate second assist torque for the driver's steering.

Figure 4:
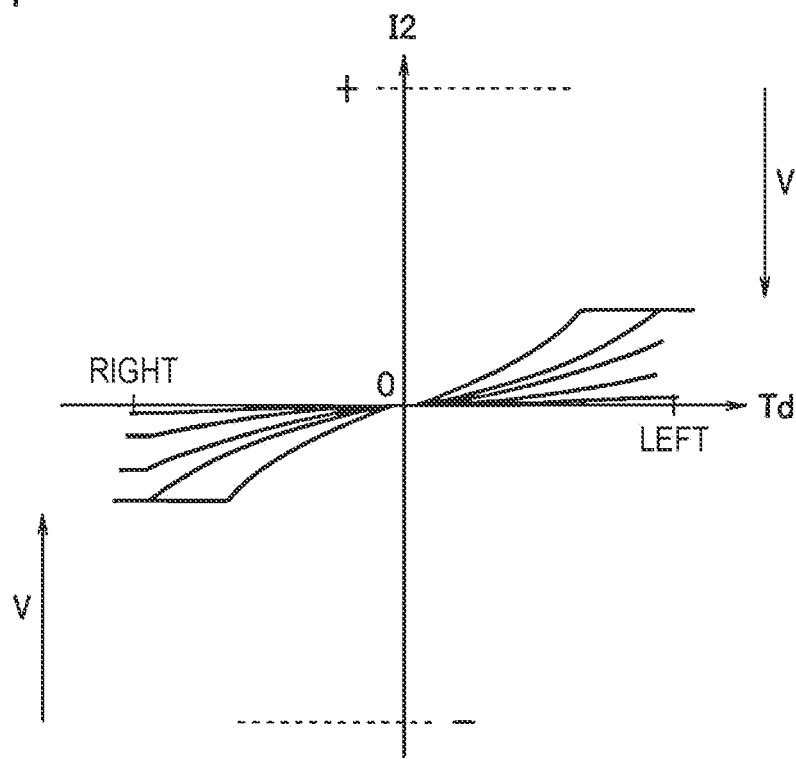
FIG. 4 is a characteristic diagram illustrating exemplary characteristics of steering torque-motor drive current during steering control with limited assist torque.

As illustrated in FIG. 4, the second map is a three-dimensional map for calculating the second motor driver current I2 on the basis of the steering torque Td and the vehicle velocity V. On the basis of the second map, the steering control unit 50 calculates the second motor driver current I2 for increasing the drive torque (absolute value) toward the driver's steering direction as the steering torque Td (absolute value) is greater, and increasing the drive torque (absolute value) for the driver's steering direction as the vehicle velocity V is smaller. Note that the second motor driver current I2 (absolute value) is a relatively smaller value than the first motor drive current I1 (absolute value) calculated for the same steering torque Td and vehicle velocity V.

The second motor driver current I2 calculated as above is output to the EPS motor 12 through the motor drive unit 20. Accordingly, the EPS motor 12 generates drive torque (second assist torque) in accordance with the second motor driver current I2.

Furthermore, in the case where it is determined by the DMS 25 that the driver information does not match the registered information, the steering control unit 50 refers to, for example, a preset third map and calculates a third motor drive current I3 after the vehicle M travels the set distance Dth1. The third motor drive current I3 is a current for allowing the EPS motor 12 to generate inhibition torque for the driver's steering.

Figure 5:
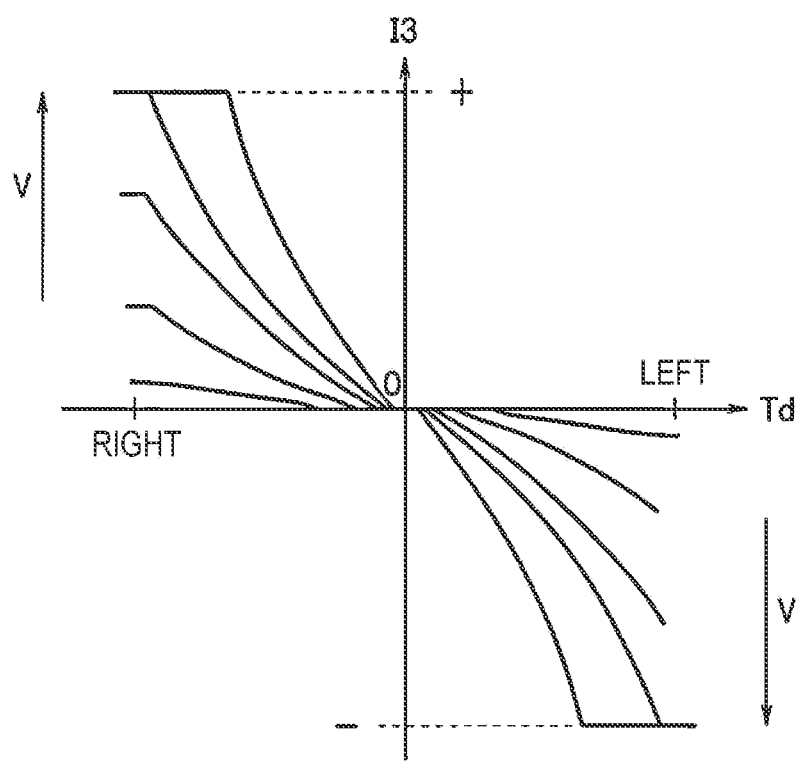
FIG. 5 is a characteristic diagram illustrating exemplary characteristics of steering torque-motor drive current when steering is prohibited.

As illustrated in FIG. 5, the third map is a three-dimensional map for calculating the third motor drive current I3 on the basis of the steering torque Td and the vehicle velocity V. On the basis of the third map, the steering control unit 50 calculates the third motor drive current I3 for increasing the drive torque (absolute value) toward a direction (inhibition side) opposite to the driver's steering direction as the steering torque Td (absolute value) is greater, and increasing the drive torque (absolute value) toward a direction (inhibition side) opposite to the driver's steering direction as the vehicle velocity V is greater.

The third motor drive current I3 calculated as above is output to the EPS motor 12 through the motor drive unit 20. Accordingly, the EPS motor 12 generates drive torque (inhibition torque) in accordance with the third motor drive current I3.

In one embodiment, the steering control unit 50 may serve as a "steering controller".

Figure 2:
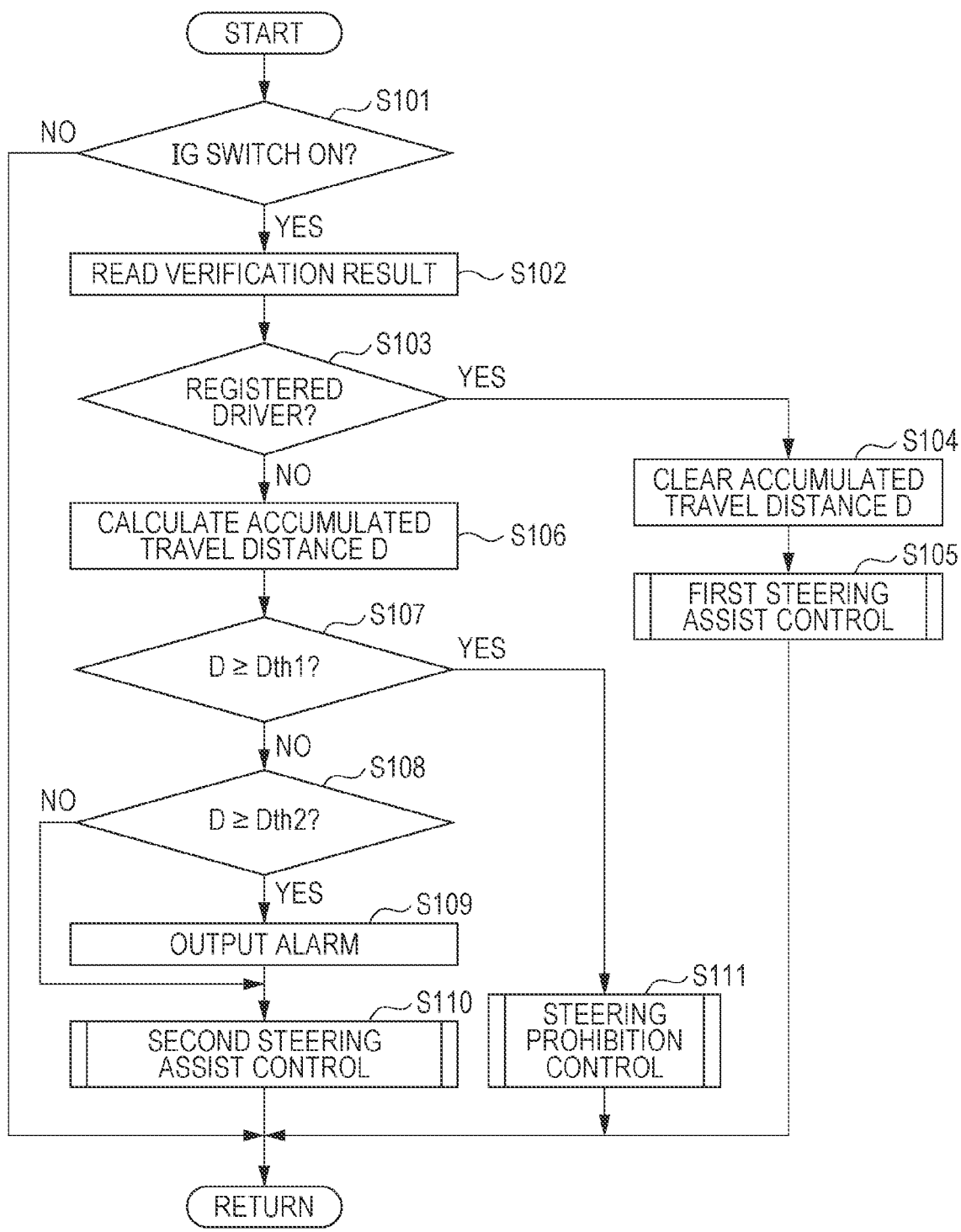
FIG. 2 is a flowchart: illustrating a steering control routine.

Next, steering control executed by the steering control unit 50 will be described in accordance with the flowchart of a steering control routine illustrated in FIG. 2. The routine is repeatedly executed every set time, for example.

As the routine starts, the steering control unit 50 checks whether the ignition switch 26 is turned on in step S101.

In the case where it is determined in step S101 that the ignition switch 26 is turned off, the steering control unit 50 exits the routine as it is.

In contrast, in the case where it is determined in step S101 that the ignition switch 26 is turned on, the steering control unit 50 proceeds to step S102, and reads the result of driver verification performed by the DMS 25.

When the steering control unit 50 proceeds from step S102 to step S103, the steering control unit 50 determines whether the driver verified by the DMS 25 matches a driver who has been registered, that is, whether the driver information matches the registered information.

In the case where it is determined in step S103 that the driver information matches the registered information, the steering control unit 50 proceeds to step S104, and clears a later-described accumulated travel distance D of the vehicle M.

In the next step S105, the steering control unit 50 performs first steering assist, and then exits the routine. That is, the steering control unit 50 refers to the preset first map (see FIG. 3), and calculates the first motor drive current I1 on the basis of the steering torque Td and the vehicle velocity V. After outputting the first motor drive current I1 to the EPS motor 12 through the motor drive unit 20, the steering control unit 50 exits the routine.

In contrast, in the case where it is determined in step S103 that the driver information does not match the registered information, the steering control unit 50 proceeds to step S106, and calculates, on the basis of the vehicle velocity V, the distance (accumulated travel distance) D traveled by the vehicle M since it is determined that the driver information does not match the registered information.

In the next step S107, the steering control unit 50 checks whether the accumulated travel distance D is greater than or equal to a preset first threshold (set distance) Dth1. Note that the first threshold Dth1 is set to about a few hundred meters.

In the case where it is determined in step S107 that the accumulated travel distance D is less than the first threshold Dth1, the steering control unit 50 proceeds to step S108, and checks whether the accumulated travel distance D is greater than or equal to a second threshold Dth2. Note that the second threshold Dth2 is set to a distance shorter than the first threshold Dth1 by about a few tens of meters.

In the case where it is determined in step S108 that the accumulated travel distance D is greater than or equal to the second threshold Dth2, the steering control unit 50 proceeds to step S109, outputs an alarm through the alarm unit 51, and proceeds to step S110. Here, the alarm output in step S109 is an alarm for warning that the steering of the vehicle M will be prohibited. For example, the steering control unit 50 outputs a message such as "Soon the vehicle will no longer be able to be steered. Please stop the vehicle in a safe place" through the alarm unit 51 using voice or an image.

In contrast, in the case where it is determined in step S108 that the accumulated travel distance D is less than the second threshold Dth2, the steering control unit 50 proceeds to step S110 as it is.

When the steering control unit 50 proceeds from step S108 or step S109 to step S110, the steering control unit 50 performs second steering assist, and then exits the routine. That is, the steering control unit 50 refers to the preset second map (see FIG. 4), and calculates the second motor driver current I2 on the basis of the steering torque Td and the vehicle velocity V. After outputting the second motor driver current I2 to the EPS motor 12 through the motor drive unit 20, the steering control unit 50 exits the routine.

In addition, in the case where it is determined in step S107 that the accumulated travel distance D is greater than or equal to the first threshold Dth1, the steering control unit 50 proceeds to step S111, performs steering prohibition control, and then exits the routine. That is, the steering control unit 50 refers to the preset third map (see FIG. 5), and calculates the third motor drive current I3 on the basis of the steering torque Td and the vehicle velocity V. After outputting the third motor drive current I3 to the EPS motor 12 through the motor drive unit 20, the steering control unit 50 exits the routine.

According to the embodiment as described above, in the case where it is determined by the DMS 25 that the driver information does not match the registered information, the steering control unit 50 permits the driver to steer from the determination to until the vehicle M travels the set distance Dth1, and, after the vehicle M travels the set distance Dth1, allows the EPS motor 12 to generate drive torque prohibiting the driver from steering. Accordingly, the EPS apparatus 1 may function as an theft deterrent apparatus for preventing theft of the vehicle M while permitting the vehicle M to move in the event of a disaster or the like.

That is, even in the case where it is determined by the DMS 25 that the driver who sits in the driver's seat is not a driver who has been registered as a user, the steering control unit 50 permits the driver to steer until the vehicle M travels the set distance Dth1. In doing so, a third person other than the legitimate user may move the vehicle M in the event of a disaster or the like. After the vehicle M travels the set distance Dth1, steering by those other than the legitimate user is prohibited, thereby precisely preventing theft of the vehicle M.

In this case, in the case where it is determined by the DMS 25 that the driver information does not match the registered information, the steering control unit 50 suppresses assist torque generated by the EPS motor 12 as compared with the case where it is determined by the DMS 25 that the driver information matches the registered information. In doing so, when a third person drives the vehicle M, careful driving may be encouraged while deterring theft.

In addition, since prohibition of the driver's steering is realized by generating inhibition torque in a direction opposite to steering torque as drive torque by the EPS motor 12, steering by a third person may be precisely prohibited.

In addition, because the steering control unit 50 warns the driver before generating inhibition torque, the vehicle M may be evacuated to a safe place before the vehicle M becomes non-steerable due to the inhibition torque.

In addition, because driver verification is performed on the basis of face recognition information obtained by the DMS 25, driver verification may be realized without forcing the driver who is seated in the driver's seat to perform a special recognition action or the like.

Here, in the above-described embodiment, the DMS 25 and the steering control unit 50 are each configured with a microcomputer equipped with a central processing unit (CPU), random-access memory (RAM), read-only memory (ROM), and non-volatile storage, and its peripherals, and the ROM stores in advance programs executed by the CPU, fixed data such as data tables, etc. Note that all or some of the functions of a processor may be configured by a logic circuit or an analog circuit, and processing of various programs may be realized by an electronic circuit such as a field-programmable gate array (FPGA).

The disclosure described in the above embodiment is not limited to the embodiment, and various modifications may be implemented in the embodiment without departing from the gist thereof. For example, although one example in which driver authentication (verification) is performed by face recognition has been described in the above embodiment, the disclosure is not limited to this example, and driver authentication (verification) may be performed by fingerprint authentication or the like.

In addition, even when one or some of all the components discussed in the above embodiment are removed, if the above matter may be appropriately handled, the configuration from which these components are removed may be extracted as an embodiment of the disclosure.

The steering control unit 50 and the DMS 25 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the steering control unit 50 and the DMS 25. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the steering control unit 50 and the DMS 25.

The invention claimed is:

1. A vehicle theft deterrent apparatus to be applied to a vehicle, the vehicle theft deterrent apparatus comprising:
a steering torque detector configured to detect steering torque input by a driver who drives the vehicle to a steering system of the vehicle;
an actuator configured to generate drive torque to be given to the steering system;
a driver verifier configured to verify whether driver information obtained from the driver matches registered information registered in advance; and
a steering controller configured to control the drive torque generated by the actuator based on the steering torque,
wherein, in a case where the driver verifier determines that the driver information does not match the registered information, the steering controller is configured to permit the driver to steer until the vehicle travels a set distance, and then to cause the actuator to generate the drive torque to prohibit the driver from steering of the steering system.

2. The vehicle theft deterrent apparatus according to claim 1, wherein
in a case where the driver verifier determines that the driver information matches the registered information, the steering controller is configured to cause the actuator to generate first assist torque as the drive torque, and
the steering controller is configured to cause the actuator to generate second assist torque smaller than the first assist torque as the drive torque for a period from when it is determined that the driver information does not match the registered information to when the vehicle travels the set distance.

3. The vehicle theft deterrent apparatus according to claim 2, wherein, after the vehicle travels the set distance after it is determined that the driver information does not match the registered information, the steering controller is configured to cause the actuator to generate inhibition torque in a direction opposite to a direction of the steering torque, the inhibition torque being to be the drive torque.

4. The vehicle theft deterrent apparatus according to claim 3, wherein the driver verifier is configured to obtain face recognition information of the driver as the driver information.

5. The vehicle theft deterrent apparatus according to claim 4, wherein, before causing the drive torque to prohibit the driver from steering to be generated, the steering controller is configured to warn the driver.

6. The vehicle theft deterrent apparatus according to claim 3, wherein, before causing the drive torque to prohibit the driver from steering to be generated, the steering controller is configured to warn the driver.

7. The vehicle theft deterrent apparatus according to claim 2, wherein the driver verifier is configured to obtain face recognition information of the driver as the driver information.

8. The vehicle theft deterrent apparatus according to claim 7, wherein, before causing the drive torque to prohibit the driver from steering to be generated, the steering controller is configured to warn the driver.

9. The vehicle theft deterrent apparatus according to claim 2, wherein, before causing the drive torque to prohibit the driver from steering to be generated, the steering controller is configured to warn the driver.

10. The vehicle theft deterrent apparatus according to claim 1, wherein, after the vehicle travels the set distance after it is determined that the driver information does not match the registered information, the steering controller is configured to cause the actuator to generate inhibition torque in a direction opposite to a direction of the steering torque, the inhibition torque being to be the drive torque.

11. The vehicle theft deterrent apparatus according to claim 10, wherein the driver verifier is configured to obtain face recognition information of the driver as the driver information.

12. The vehicle theft deterrent apparatus according to claim 11, wherein, before causing the drive torque to prohibit the driver from steering to be generated, the steering controller is configured to warn the driver.

13. The vehicle theft deterrent apparatus according to claim 10, wherein, before causing the drive torque to prohibit the driver from steering to be generated, the steering controller is configured to warn the driver.

14. The vehicle theft deterrent apparatus according to claim 1, wherein the driver verifier is configured to obtain face recognition information of the driver as the driver information.

15. The vehicle theft deterrent apparatus according to claim 14, wherein, before causing the drive torque to prohibit the driver from steering to be generated, the steering controller is configured to warn the driver.

16. The vehicle theft deterrent apparatus according to claim 1, wherein, before causing the drive torque to prohibit the driver from steering to be generated, the steering controller is configured to warn the driver.

17. A vehicle theft deterrent apparatus to be applied to a vehicle, the vehicle theft deterrent apparatus comprising:
a steering torque sensor configured to detect steering torque input by a driver to a steering system of the vehicle;
an actuator configured to generate drive torque to be given to the steering system; and
one or more processors configured to:
verify whether driver information obtained from the driver matches registered information registered in advance;
control the drive torque generated by the actuator based on the steering torque; and
in a case where it is determined that the driver information does not match the registered information, permit the driver to steer until the vehicle travels a set distance, and then cause the actuator to generate the drive torque to prohibit the driver from steering of the steering system.

18. A vehicle theft deterrent apparatus to be applied to a vehicle, the vehicle theft deterrent apparatus comprising:
a steering torque detector configured to detect steering torque input by a driver who drives the vehicle to a steering system of the vehicle;
an actuator configured to generate drive torque to be given to the steering system;
one or more processors programmed to:
verify whether driver information obtained from the driver matches registered information registered in advance;
control the drive torque generated by the actuator based on the steering torque; and
in a case where the driver verifier determines that the driver information does not match the registered information, permit the driver to steer until the vehicle travels a set distance, and then to cause the actuator to generate the drive torque to prohibit the driver from steering of the steering system.

* * * * *